(12) United States Patent
Piaget et al.

(10) Patent No.: US 8,695,992 B2
(45) Date of Patent: Apr. 15, 2014

(54) TOW ASSEMBLY FOR A TRAILER

(75) Inventors: Gary D. Piaget, East Sound, WA (US); Herbert Walter Bentz, Vancouver (CA)

(73) Assignee: Gary Piaget, East Sound, WA (US)

(*) Notice: Subject to any disclaimer, the term of this patent is extended or adjusted under 35 U.S.C. 154(b) by 18 days.

(21) Appl. No.: 13/589,871

(22) Filed: Aug. 20, 2012

(65) Prior Publication Data
US 2013/0300072 A1 Nov. 14, 2013

Related U.S. Application Data

(60) Provisional application No. 61/646,612, filed on May 14, 2012.

(51) Int. Cl.
*B60D 1/00* (2006.01)

(52) U.S. Cl.
USPC ............ 280/1.5; 280/204; 280/292; 280/202

(58) Field of Classification Search
USPC .................................. 280/1.5, 204, 292, 202
See application file for complete search history.

(56) References Cited

U.S. PATENT DOCUMENTS

| | | | |
|---|---|---|---|
| 2,365,174 A | 12/1944 | Cochran | |
| 3,829,125 A * | 8/1974 | Davis | 280/204 |
| 4,236,723 A | 12/1980 | Lemmon | |
| 4,848,780 A * | 7/1989 | Straub | 280/1.5 |
| 5,054,800 A | 10/1991 | Christensen et al. | |
| 5,062,651 A | 11/1991 | Varieur | |
| 5,076,599 A * | 12/1991 | Lockett et al. | 280/204 |
| 5,224,720 A | 7/1993 | Chaw et al. | |
| 5,259,634 A | 11/1993 | Berner et al. | |
| 5,265,891 A * | 11/1993 | Diehl | 280/1.5 |
| 5,301,963 A | 4/1994 | Chen | |
| 5,318,318 A | 6/1994 | Berner et al. | |
| 5,344,171 A | 9/1994 | Garforth-Bles | |
| 5,364,119 A * | 11/1994 | Leu | 280/647 |

(Continued)

FOREIGN PATENT DOCUMENTS

| | | |
|---|---|---|
| DE | 19919175 A1 | 11/1999 |
| DE | 19826267 A1 | 12/1999 |

OTHER PUBLICATIONS

Bicycle Trailer Stroller, www.strollers.com, http://strollers.com/bike-dog-stroller/ (Accessed: Jun. 1, 2012).

(Continued)

*Primary Examiner* — Kevin Hurley
*Assistant Examiner* — Michael Stabley
(74) *Attorney, Agent, or Firm* — Barlow, Josephs & Holmes, Ltd.

(57) ABSTRACT

A convertible trailer assembly is provided that can be pushed or pulled. The trailer assembly can be converted between pushed or pulled operation or provided as a retrofit assembly for a stroller that allows its conversion between pushed or pulled operation. The Assembly includes a linkage assembly to provide a smoother towing experience for the user. The linkage uniquely takes up the constant jarring motion that is incompatible as between the user and the trailer and dissipates it in a toggle that consists of a lever extending upwardly from a tow point on the trailer. When accelerating or going uphill the toggle pulls forward, at equilibrium the toggle motion absorbs the incremental differences in acceleration/deceleration and at the rear limit of its range of motion, the toggle pushes a brake actuator to slow the trailer.

12 Claims, 6 Drawing Sheets

(56) References Cited

U.S. PATENT DOCUMENTS

| | | | |
|---|---|---|---|
| 5,375,861 A | 12/1994 | Gifford | |
| 5,421,597 A * | 6/1995 | Berner | 280/204 |
| 5,460,395 A | 10/1995 | Chen | |
| 5,474,316 A * | 12/1995 | Britton | 280/204 |
| 5,577,746 A * | 11/1996 | Britton | 280/204 |
| 5,599,033 A * | 2/1997 | Kolbus et al. | 280/204 |
| 5,979,921 A * | 11/1999 | Derven et al. | 280/204 |
| 6,098,993 A | 8/2000 | Bellinson | |
| 6,139,033 A | 10/2000 | Western | |
| 6,196,572 B1 | 3/2001 | Durrin | |
| 6,764,087 B2 * | 7/2004 | Assaf et al. | 280/204 |
| 7,549,648 B2 | 6/2009 | Girard et al. | |
| 7,766,359 B2 | 8/2010 | Klevana et al. | |
| 7,938,409 B2 | 5/2011 | Mejia | |
| 8,240,695 B1 * | 8/2012 | Liu | 280/503 |
| 2001/0038190 A1* | 11/2001 | Provencher | 280/281.1 |
| 2002/0096857 A1 | 7/2002 | Valdez et al. | |
| 2002/0135155 A1* | 9/2002 | Leon | 280/204 |
| 2006/0055128 A1 | 3/2006 | Scott et al. | |
| 2007/0187910 A1 | 8/2007 | Adams | |
| 2008/0018063 A1 | 1/2008 | Morowat | |
| 2008/0238024 A1 | 10/2008 | Heidenreich et al. | |
| 2010/0133784 A1 | 6/2010 | Shalaby et al. | |
| 2010/0244405 A1* | 9/2010 | Assaf | 280/415.1 |
| 2011/0068561 A1 | 3/2011 | Horovitz | |
| 2012/0313345 A1* | 12/2012 | Kamler et al. | 280/292 |

OTHER PUBLICATIONS

Chariot Universal Hiking, http://babies1st.com, http://babies1st.com/p-28114-chariot-universal-hiking-cts-kit-free-shipping.aspx (Accessed: Jun. 1, 2012).

Copilot Model A Bike Trailer/Jogging Stroller, www.sunandski.com, http://www.sunandski.com/Copilot_Model_A_Trailer_p/7781063200505.htm (Accessed: Jun. 1, 2012).

Little Tikes jogging stroller/bike trailer, http://cranbrook.canadianlisted.com, http://cranbrook.canadianlisted.com/bicycles/little-tikes-jogging-stroller-bike-trailer_748670.html (Accessed: Jun. 1, 2012).

Schwinn Trailblazer Bike Trailer Stroller Bicycle Jogging Stroller 13-SC671 NEW, www.ebay.com, http://compare.ebay.com/like/310398136472?var=vl&sort=BestMatch (Accessed: Jun. 1, 2012).

Zigo Mango Stroller/Jogger/Trailer for Spring 2012, www.carrierbake.com, http://www.carrierbike.com/2012/03/04/zigo-mango-strollerjoggertrailer-for-spring-2012/ (Accessed: Jun. 1, 2012).

Discovery Dual Bicycle Trailer and Jogging Stroller Combination, www.ebay.com, http://orangecounty.ebayclassifieds.com/baby-kid-stuff/long-beach/discovery-dual-bicycle-trailer-and-jogging-stroller-combination/?ad=19462027 (Accessed: Jun. 1, 2012).

* cited by examiner

TOW ASSEMBLY FOR A TRAILER

CROSS-REFERENCE TO RELATED APPLICATIONS

This application is related to and claims priority from earlier filed U.S. Provisional Patent Application No. 61/646,612, filed May 14, 2012.

BACKGROUND OF THE INVENTION

The present invention relates generally to a convertible trailer assembly that can be pushed or pulled. More specifically, the present invention relates to an improved trailer assembly that can be converted between pushed or pulled operation or a retrofit assembly for a stroller that allows its conversion between pushed or pulled operation and includes a linkage assembly to provide a smoother towing experience for the user.

There are a number of convertible trailer/stroller devices in the art configured to convert between human powered pushing operation and towing operation such as behind a bicycle. Such devices generally employ a chariot type arrangement for the load carrying portion and then a forward section is modular such that different components can be installed for towing the trailer behind a bike or allowing the stroller to be employed in a pushed fashion by a user who is walking or jogging. One problem with such convertible devices however is that there are often additional parts and components that must be removed and stored and often tools are required to make the conversion.

Further the ergonomics of multi-function conversion devices is often overlooked. When using such a device as a trailer for a bicycle it is towed. However when converted to a jogger or stroller the device is pushed. In part this is necessitated by the fact that should a traditional device be towed by a jogging user the motion is jerky and incompatible with jogging. When a user is walking, the trailer is constantly accelerating and decelerating. This corresponds with a person's gait. This type of motion causes the trailer to feel as though it is pushing and pulling behind you as it catches up and falls behind with every step. While jogging, the motion is smoother, but the hitch point on the back moves up and down.

For example, U.S. Pat. No. 4,848,780 provides a carriage for a jogger that affixes to a belt worn about a user's waist. Further it can be seen that it includes a three link linkage that allows freedom to absorb the runner's strides through a pushing and pulling motion within the linkages. Similarly, U.S. Pat. No. 5,265,891 provides a trailer that employs a harness that goes over the wearer's shoulders and around their chest. The attachment point includes a universal joint and a spring that attempts to buffer motion induced from the road as well as from the wearer's stride. Still further, U.S. Pat. No. 7,938,409 provides for a trailer tow that employs a universal ball joint to introduce flexibility and several degrees of freedom to the attachment point as well as a resilient, shock absorbing member. However, none of these systems address the real issue of the momentum and inertia of the movement of the trailer itself.

Therefore, there is a need for a trailer device that can universally serve as a bicycle or human towed trailer that has a smooth towing motion that is comfortable for both walking and jogging, and can further operate as a steerable three wheel pushed stroller or wagon. There is a further need for such a device that can be instantly converted without the need for adding or subtracting parts as required in prior art conversions.

BRIEF SUMMARY OF THE INVENTION

In this regard, the present invention provides for a convertible trailer assembly that can be pushed or pulled. More specifically, the present invention relates to an improved trailer assembly that can be converted between pushed or pulled operation or as a retrofit assembly for a stroller that allows its conversion between pushed or pulled operation and includes a linkage assembly to provide a smoother towing experience for the user.

As stated above, when such a trailer is being towed the trailer is constantly accelerating and decelerating. This corresponds with a person's gait. This type of motion causes the trailer to feel as though it is pushing and pulling behind you as it catches up and falls behind with every step. While jogging, the motion is smoother, but the hitch point on the back moves up and down. To solve the above problems, the present invention provides a conversion assembly that adds a steerable third wheel to the trailer making it more stable and versatile. With the attachment in place, the trailer can be instantly converted, without adding or subtracting parts, from a bicycle trailer to a hand pulled cargo trailer, to a conventional jogging stroller or to the exiting new mode of a hands free jogging trailer. While also adding a steerable third wheel to the trailer a unique steering/towing linkage assembly is also provided. The linkage uniquely takes up the constant jarring motion that is incompatible as between the user and the trailer and dissipates it in a toggle assembly.

The toggle assembly consists of a lever extending upwardly from a tow point on the trailer. The lever is pivotally affixed so that it can move back and forth. While the toggle has a predetermined and limited range of motion, it is provided with sufficient freedom such that it can dissipate the constant jarring motion of a jogging or walking user when towing the trailer. When accelerating or going uphill the toggle pulls to the forward end of the range of motion pulling the trailer along. As the user hits their stride an equilibrium is reached such that the jogger and trailer are moving at the same speed and the toggle motion absorbs the incremental differences in acceleration/deceleration and makes for a smooth interface.

Further it can be seen that as the toggle reaches the rear limit of its range of motion, it reaches and pushes a brake actuator to slow the trailer if it begins to gain too much speed, preventing the trailer from pushing on the user.

On the harness for attaching the tow assembly to the user a wide rigid harness piece is affixed to the user to spread any loads of the trailer about the core of the user. The tow bar is attached to the harness using a universal joint that provides a large range of motion thereby allowing sharper turns and a freer interface. Further the tow rod and toggle linkage serve to steer the front wheel making the stroller easy and comfortable to tow.

It should be appreciated that in an alternate embodiment, the toggling action can be positioned within a telescoping action in the tow rod such that the motion absorbing and braking features become a linear action between two sections of the tow rod.

It is therefore an object of the present invention to provide a trailer device that can universally serve as a bicycle or human towed trailer that has a smooth towing motion that is comfortable for both walking and jogging, and can further operate as a steerable three wheel pushed stroller or wagon. It is a further object of the present invention to provide a device that can be instantly converted without the need for adding or subtracting parts as required in prior art conversions.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be made to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
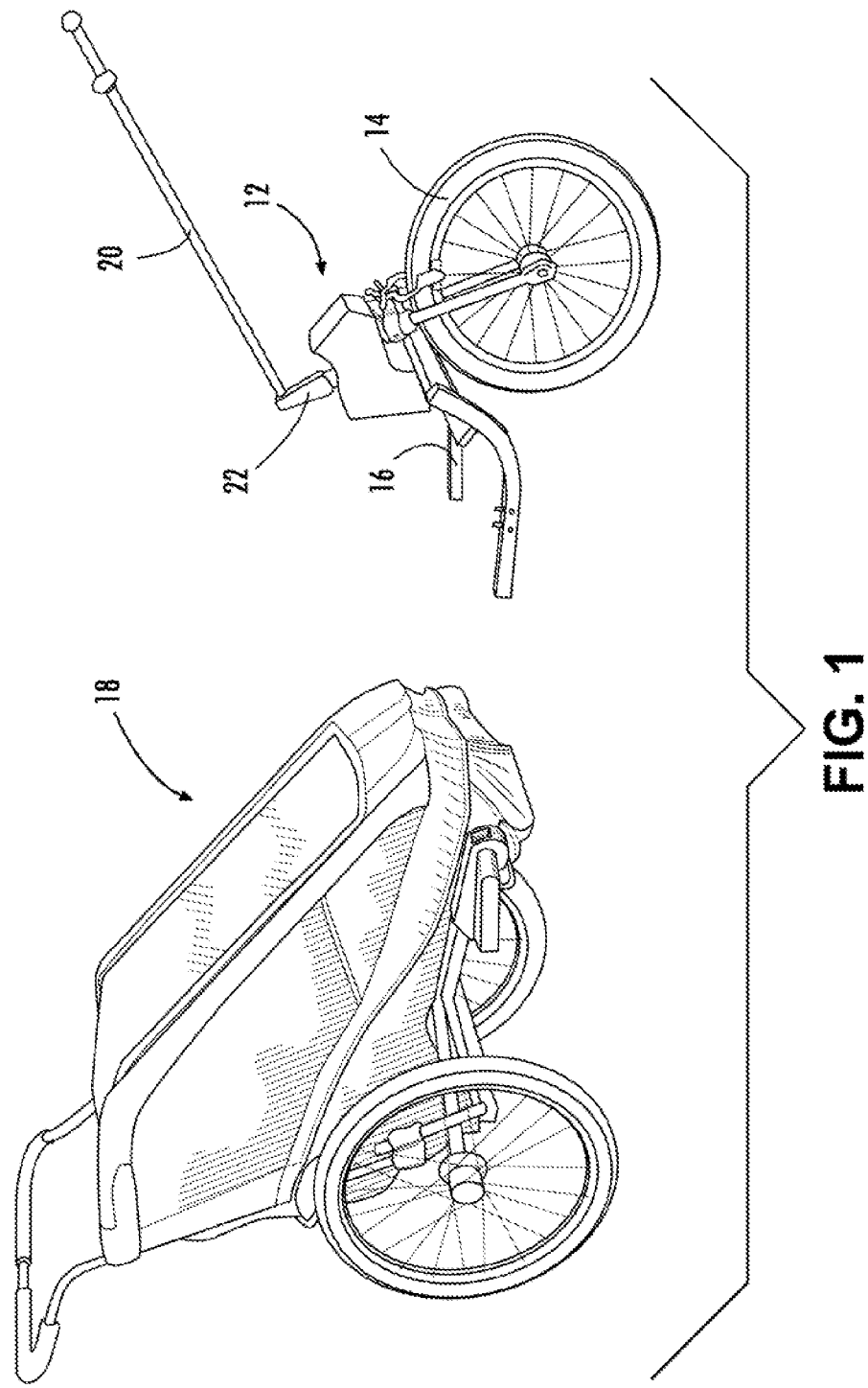
FIG. 1 is an exploded perspective view of a stroller and tow conversion assembly of the present invention.

Now referring to the drawings, a convertible trailer assembly that can be pushed or pulled is shown and generally illustrated in the figures. As can be seen the assembly is provided as a retrofit component in the figures but may also be provided as a monolithic stroller device without departing from the spirit and intent of the present disclosure. Accordingly, the disclosure relates to an improved trailer/stroller assembly that can be converted between pushed or pulled operation or as a retrofit assembly for a stroller that allows its conversion between pushed or pulled operation and particularly includes a linkage that provides a smoother towing experience for the user.

Figure 2:
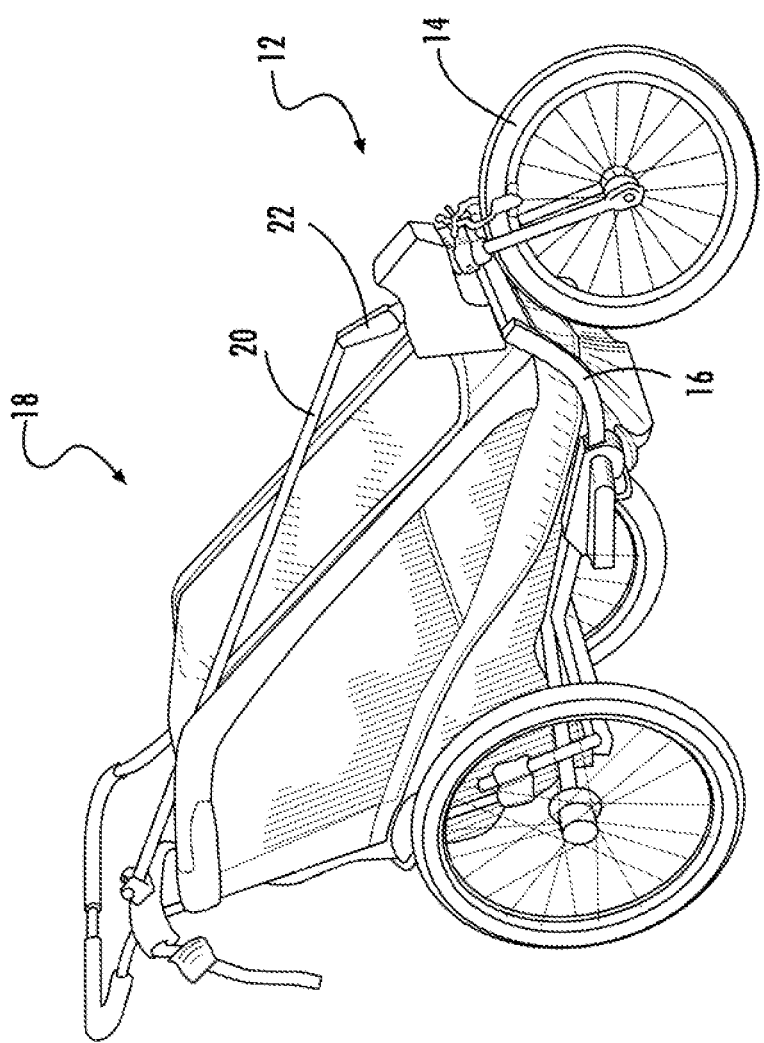
FIG. 2 is a perspective view of a stroller and tow conversion assembly of the present invention in assembled relation.

As can be seen in FIGS. 1 and 2, in a retrofit context, the conversion assembly 12 provides for a forward wheel 14 and a support frame 16 that can be attached to an existing trailer/stroller assembly 18. The forward wheel 14 is preferably pivotably received within the support frame 16 such that the forward wheel 14 allows for the trailer/stroller to be steered. A tow linkage 20 is attached to a toggle 22 post that extends up from the pivotal wheel support wherein left and right movements of the tow linkage 20 causes left and right movement of the forward wheel 14 to steer the trailer/stroller in the same direction which the tow linkage 20 is turned. The trailer/stroller assembly is preferably a two wheeled device with a cargo space and a handle for pushed operation. The trailer/stroller may be of the type to include a removable front wheel assembly such that the conversion assembly can be affixed thereto as shown in FIG. 2. Further, the trailer/stroller may be assembled as a monolithic assembly initially such that it is provided in one piece as shown in the assembled version at FIG. 2.

Figure 3A:
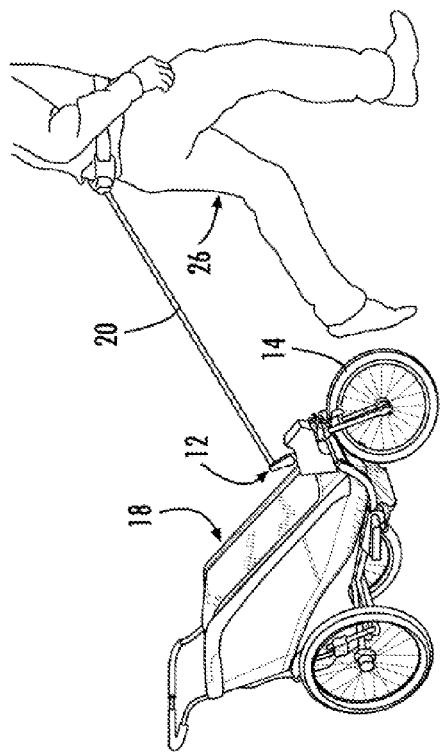
FIGS. 3a-d depict the tow conversion assembly of the present invention in its various modes of operation.
Figure 3B:
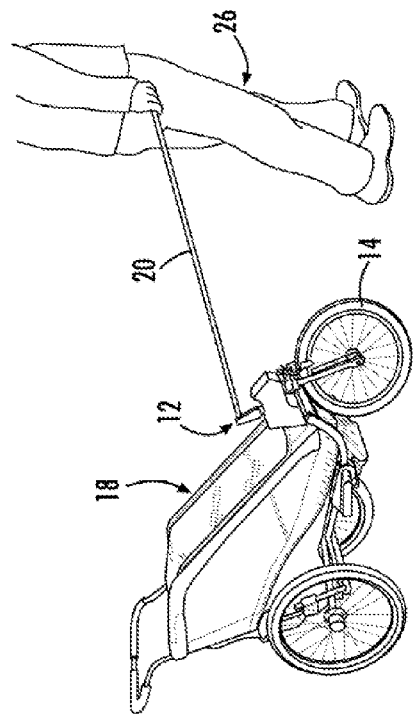
Figure 3C:
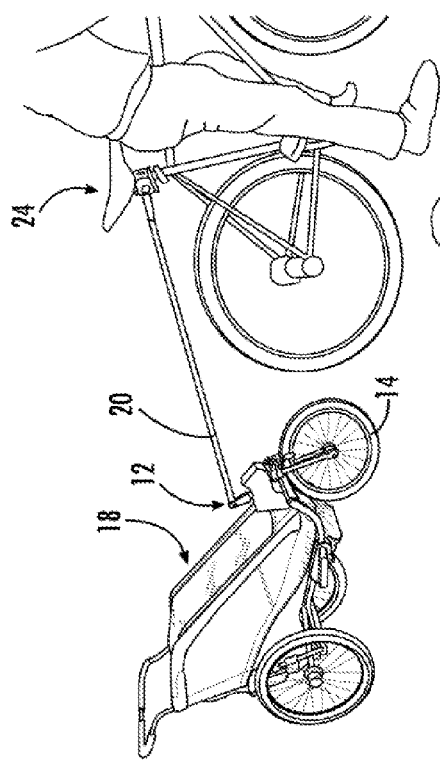
Figure 3D:
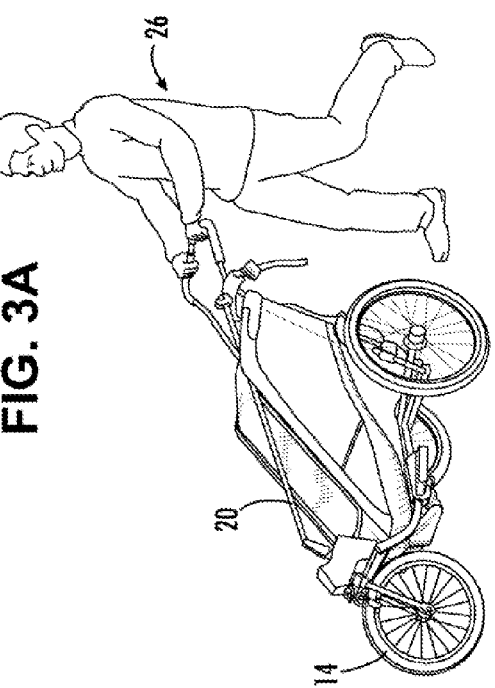

Turning Now to FIGS. 3a-3d. Various modes of operation of the convertible trailer/stroller device of the present invention are shown. In FIG. 3a, the trailer/stroller is show with the tow linkage 20 affixed to a bicycle 24 as a towed trailer. Since the tow linkage 20 also serves to steer the front wheel, as the bicycle 24 changes direction, the trailer/stroller will also turn to improve the smoothness of operation and towability of the trailer/stroller. At FIG. 3b, the trailer/stroller is also being used in towed operation wherein the tow linkage 20 is affixed to a person 26 as will be discussed in greater detail below. As stated above, the tow linkage 20 also serves to steer the front wheel, as the person 26 towing the trailer/stroller changes direction, the trailer/stroller will also turn to improve the smoothness of operation and towability of the trailer/stroller. At FIG. 3c the trailer/stroller can be seen as a traditional jogging stroller. In this mode, a person 26 pushes the stroller/trailer by a handle thereon. The tow linkage 20 is turned back against the stroller and fixed in position thereby maintaining the front wheel in a fixed position as well. By preventing the front wheel from steering in this mode greater stability is achieved for the person when jogging and operating the trailer/stroller. Finally, at FIG. 3d, the trailer stroller is being hand towed. As in the towed arrangements above, the tow linkage also serves to steer the front wheel, as the person pulling the trailer/stroller changes direction, the trailer/stroller will also turn to improve the smoothness of operation and towability of the trailer/stroller.

Figure 4:
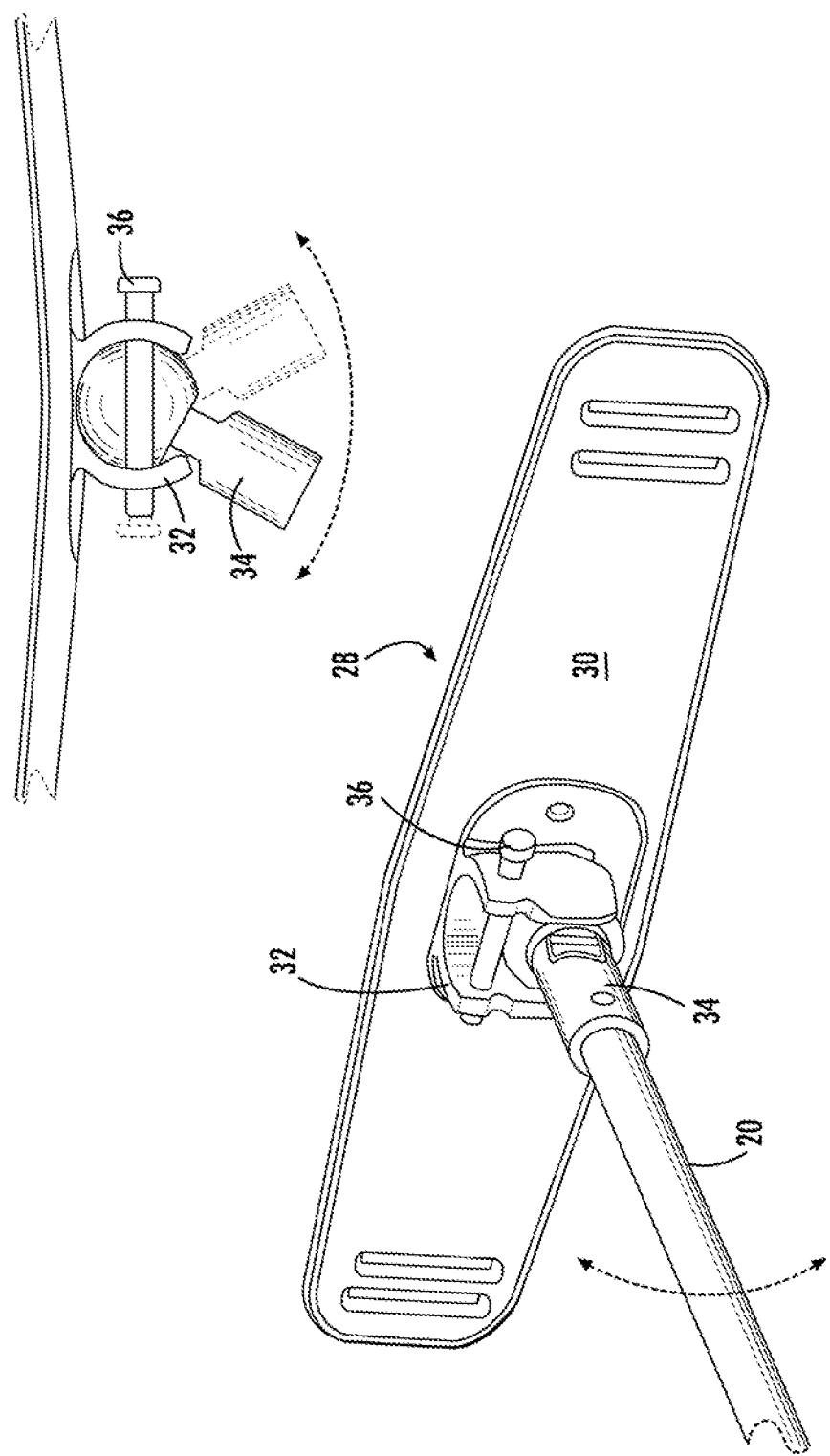
FIG. 4 depicts an interface harness used in connection with the present invention.

At FIG. 4, an attachment harness 28 is shown as an exemplary embodiment for attachment of the tow linkage 20 to a person to facilitated towed operation while the user is jogging. The harness 28 preferably includes a flexible belt 30 that is attached around the waist of the user, although attachment lower towards the hips or higher using a shoulder harness would fall within the intended scope of the present invention.

A universal joint receiver 32 is affixed to the center of the belt 30. The end of the tow linkage 20 is removably received into the universal joint receiver 32. The end of the tow linkage 20 preferably includes a mating formation that is received and releasably retained within the universal joint receiver 32. In this embodiment the arrangement is shown to include a socket on the receiver and a ball 34 at the end of the tow linkage 20 in a manner that allows a substantial degree of freedom both in the horizontal and vertical planes. The range of motion provided by this connection allows sharper turning and better user accessibility to the trailer/stroller when towing. Further, a retention means, such as the pin 36 shown, or any other catch mechanism known in the art is provided so that the user can selectively retain the tow linkage in the receiver and prevent accidental dislodgement thereof.

When such a trailer is being towed the, trailer is constantly accelerating and decelerating in a manner that corresponds to the gait of the person towing the trailer/stroller. This motion causes the trailer to feel as though it is pushing and pulling behind the user as it catches up and falls behind with every step. While jogging, this motion is somewhat smoother, but the hitch point on the back moves up and down. A toggle 22 provided within the tow linkage uniquely takes up the constant jarring motion that is incompatible as between the user and the trailer and dissipates the motion within the toggle assembly.

Figure 5:
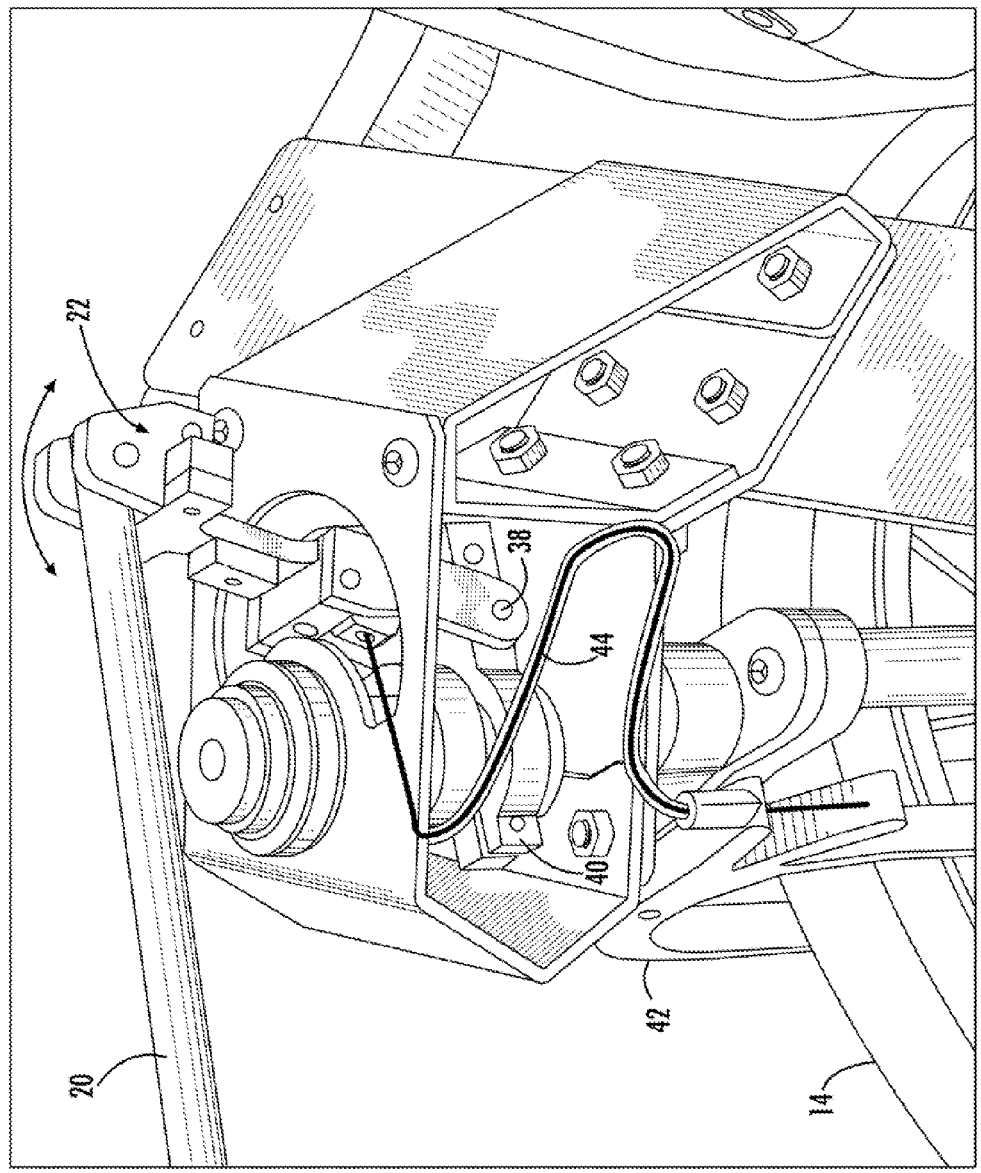
FIG. 5 depicts the toggle/brake assembly of the present invention.

The toggle assembly as depicted at FIG. 5 consists of a toggle lever 22 extending upwardly from a tow point on the trailer. The lever 22 is pivotally affixed about a pivot point 38 so that it can move back and forth relative to the motion and tow direction of the trailer/stroller. While the toggle 22 has a predetermined and limited range of motion, it is provided with sufficient forward and rearward range of motion such that it can dissipate the constant jarring motion of a jogging or walking user when towing the trailer. The lower end of the toggle 22 is affixed to a lever 40 on the pivotal wheel support. The lever 40 translates the turning motion of the tow linkage 20 into a rotational movement of the front wheel 14. Also can be seen is a caliper brake set 42 positioned to apply a braking force to the front wheel 14. A brake cable 44 extends between the toggle 22 and the caliper 42 to allow motion of the toggle 22 to actuate the brake 42 as will be described below.

Figure 6:
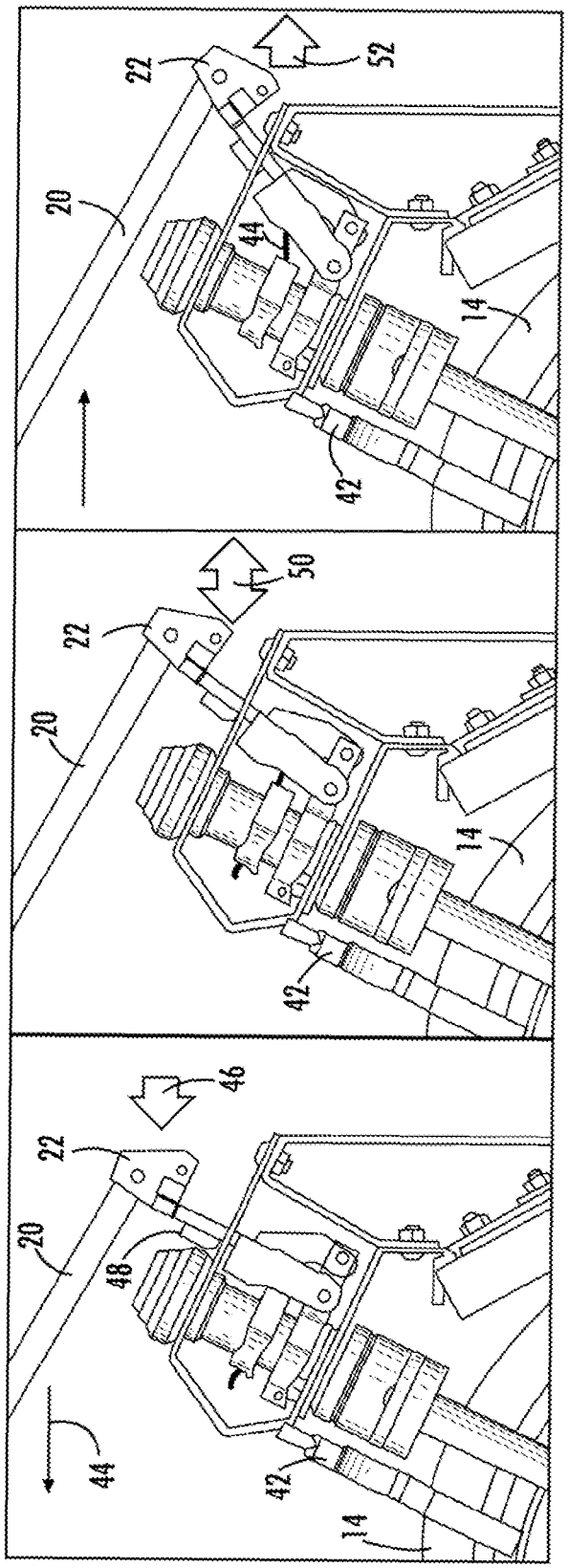
FIG. 6 depicts the operation of the toggle/brake assembly of the present invention.

Turning now to FIG. 6, operation of the toggle 22 assembly is shown and illustrated in detail. When accelerating or going uphill the user puts a steady forward force 44 on the tow linkage which in turn causes the toggle 22 to pull 46 to the forward end of its range of motion pulling the trailer along. A bumper 48 is provided as a cushion against the full forward position of the toggle 22. As the user hits their stride equilibrium is reached such that the jogger and trailer are moving at the same speed. The user's stride creates a constant forward and backward motion 50 as described above. The freedom of motion of the toggle in the forward and back direction absorbs the incremental differences in acceleration/deceleration and makes for a smooth interface. Further, it can be seen that as the toggle 22 reaches the rear limit of its range of motion 52, such as when the user is slowing or going downhill such that the trailer/stroller is then moving faster than the user, the toggle it reaches its rear range of motion and applies a the braking action to the wheel. In this case the toggle pulls the brake cable that in turn applies the brake to slow the trailer if it begins to gain too much speed, preventing the trailer from pushing on the user.

While a cable is shown as the means for actuating the brake, it should be appreciated that brake linkages are well known in the art and any known linkage for the application of the brake is intended to fall within the scope of this disclosure. It should also be appreciated that in an alternate embodiment, the toggling action can be positioned within or adjacent to a telescoping action in the tow linkage. In this arrangement the forward and rearward portion of the linkage has a telescoping range of motion as between them and that range of motion has a fixed length. In this manner the motion as described above when absorbing and braking becomes a linear action between two sections of the tow linkage.

It can therefore be seen that the present invention provides a trailer device that can universally serve as a bicycle or human towed trailer that has a smooth towing motion that is comfortable for both walking and jogging, and can further operate as a steerable three wheel pushed stroller or wagon. Further the present invention provides a device that can be instantly converted without the need for adding or subtracting parts as required in prior art conversions. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A convertible stroller assembly, comprising:
   a stroller body having a frame and a forward wheel support;
   a pivotal shaft received in said forward wheel support and supporting a forward wheel;
   a tow linkage having a first end connected to said pivotal shaft and a user interface at said second end; and
   a toggle lever at said first end of said tow linkage between said first end and said pivotal shaft to absorb acceleration and deceleration of said stroller as it is towed by said user interface.

2. The convertible stroller of claim 1, wherein lateral movement of said tow linkage controls rotation of said pivotal shaft to steer said forward wheel.

3. The convertible stroller of claim 1, further comprising a brake configured to apply a braking force to said forward wheel.

4. The convertible stroller of claim 3, further comprising a brake linkage between said brake and said toggle lever, wherein said toggle displaces said brake linkage causing said brake to apply a braking force.

5. The convertible stroller of claim 1, further comprising:
   a wearable harness with a receiver thereon to receive and retain said user interface.

6. The convertible stroller of claim 1, wherein said forward wheel support is detachable from said stroller body.

7. The convertible stroller of claim 1, wherein said forward wheel support formed monolithically with said stroller body.

8. A retrofit assembly for a convertible stroller assembly including a stroller body having a frame and a removable forward wheel support, comprising:
   a replacement forward wheel support;
   a pivotal shaft received in said forward wheel support and supporting a forward wheel;
   a tow linkage having a first end connected to said pivotal shaft and a user interface at said second end; and
   a toggle lever at said first end of said tow linkage between said first end and said pivotal shaft to absorb acceleration and deceleration of said stroller as it is towed by said user interface.

9. The retrofit assembly of claim 8, wherein lateral movement of said tow linkage controls rotation of said pivotal shaft to steer said forward wheel.

10. The retrofit assembly of claim 8, further comprising a brake configured to apply a braking force to said forward wheel.

11. The retrofit assembly of claim 10, further comprising a brake linkage between said brake and said toggle lever, wherein said toggle displaces said brake linkage causing said brake to apply a braking force.

12. The retrofit assembly of claim 8, further comprising:
   a wearable harness with a receiver thereon to receive and retain said user interface.

* * * * *